No. 818,481.　　　　　　　　　　　　　　　PATENTED APR. 24, 1906.
G. L. SPENCER.
APPARATUS FOR MEASURING AND DELIVERING LIQUIDS.
APPLICATION FILED SEPT. 16, 1903.
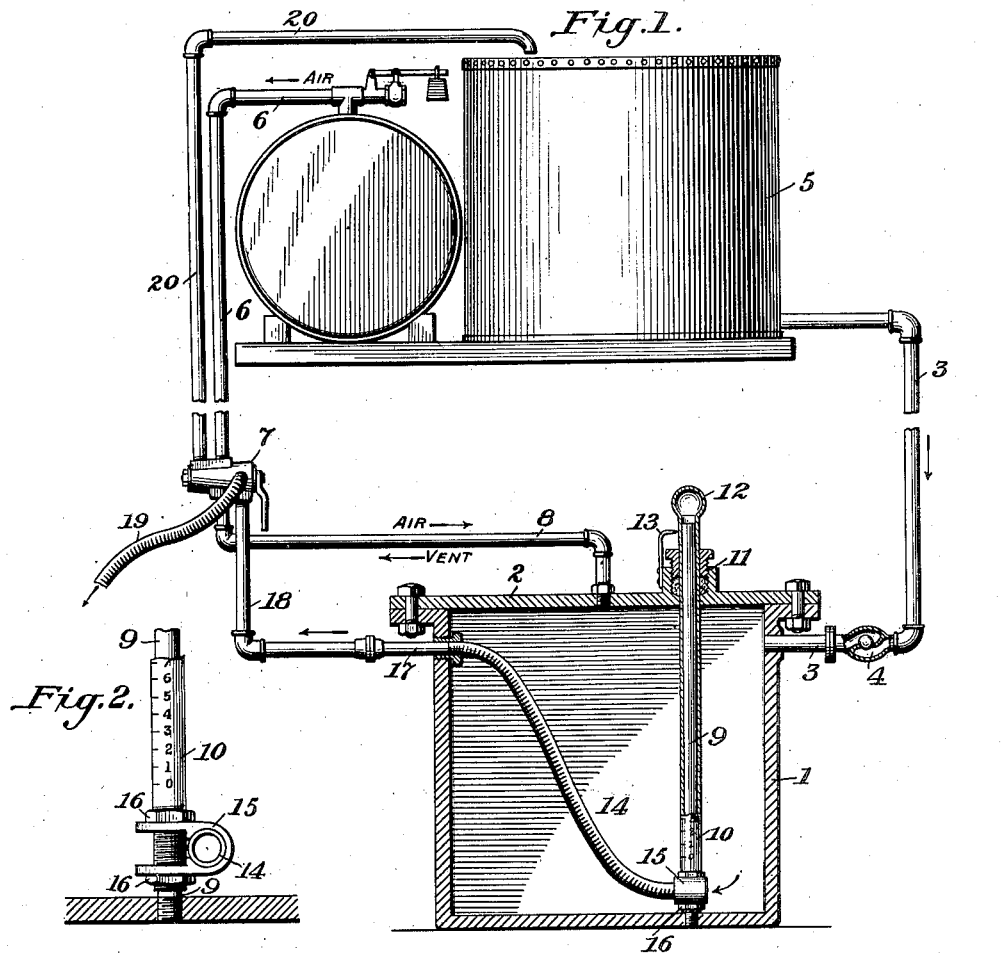
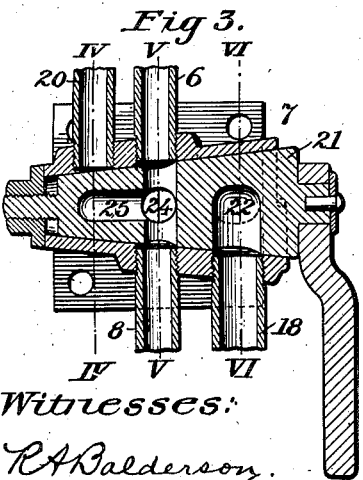
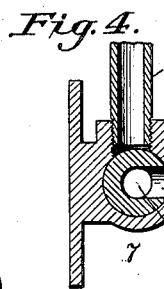
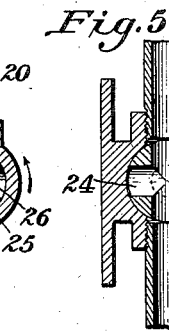
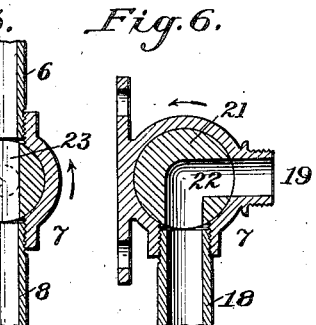
Witnesses:
R. A. Balderson
J. B. Hill
Inventor:
Guilford L. Spencer,
by Byrnes & Townsend
Attys.

UNITED STATES PATENT OFFICE.

GUILFORD L. SPENCER, OF WASHINGTON, DISTRICT OF COLUMBIA.

APPARATUS FOR MEASURING AND DELIVERING LIQUIDS.

No. 818,481.       Specification of Letters Patent.     Patented April 24, 1906.

Application filed September 16, 1903. Serial No. 173,445.

*To all whom it may concern:*

Be it known that I, GUILFORD L. SPENCER, a citizen of the United States, residing at Washington, in the District of Columbia, have invented certain new and useful Improvements in Apparatus for Measuring and Delivering Liquids, of which the following is a specification.

This apparatus is designed to automatically measure and deliver a definite but variable quantity of a liquid.

The apparatus essentially comprises an airtight measuring vessel having an inlet for the liquid, a check-valve in this inlet to prevent outflow of the liquid through it, an inlet for the introduction of compressed air, which is employed to force the liquid out of the vessel, and an outlet-pipe for the liquid having one end within and vertically adjustable with relation to the vessel. A scale and index are provided to indicate the position of the end of the outlet-pipe within the vessel. A storage and supply tank is arranged above the measuring vessel in position to deliver the liquid thereto by gravity.

A convenient accessory to the apparatus is a four-way cock having an inlet and outlet for the measured liquid, an inlet and outlet for the compressed air, and an outlet for venting the measuring vessel through the compressed-air pipe as it is being filled from the storage-tank. This cock has an apertured turn-plug, which in one position closes the liquid and air inlets and opens the vent-outlet and which when turned one-quarter closes the vent-outlet, admits the compressed air to the measuring vessel, and opens the liquid-outlet from the vessel.

The invention will be readily understood by reference to the accompanying drawings, in which—

Figure 1 is a side elevation of the apparatus with the measuring vessel in axial section. Fig. 2 is a detail view of a clamp for the movable end of the outlet-pipe and a portion of a graduated tube carrying this movable end. Fig. 3 is a vertical axial section through the four-way cock; and Figs. 4, 5, and 6 are transverse sections of the cock on the lines IV IV, V V, and VI VI of Fig. 3.

The measuring vessel 1, which may consist of enameled cast-iron, is hermetically closed at its upper end by a removable cover 2. A liquid-supply pipe 3, having a check-valve 4, extends downwardly from a storage-tank 5 and opens into the upper end of the vessel. An air-pipe 6 extends from a compressed-air tank downwardly to the four-way cock 7, from which an air-pipe 8 extends to and opens through the cover of the measuring vessel. A vertical guide-rod 9 is threaded at its lower end into the bottom of the vessel and extends upwardly through an opening in the cover. Upon this rod slides a graduated metal tube 10, which passes adjustably through a stuffing-box 11 on the cover and is closed at its upper end 12. An index 13 is fixed upon the cover to mark the position of the tube 10 by reference to the graduations upon it. The liquid-outlet pipe, here shown as a flexible rubber tube 14, is secured at one end to the lower end of the graduated tube by means of a spring-clamp 15, surrounding the tube 14, and compressed thereon by check-nuts 16, threaded on the lower end of the tube 10. The other end of the outlet-pipe 14 is secured to a short nipple 17, which extends through the side of the measuring vessel near its upper end. From this nipple a pipe 18 leads to the four-way cock. A corresponding liquid-delivery pipe 19 leads from this cock to any desired point. A vent-pipe 20 leads upwardly from the cock to a point above the highest level of the liquid in the storage-tank 5. The upper end of this pipe 20 is here shown as extended over the storage-tank.

Referring now to Figs. 3 to 6, it will be seen that the turn-plug 21 of the cock 7 has near one end a right-angular passage 22. Midway its length the plug has a transverse passage 23, which is intersected at right angles by a passage 24. An axial passage extends from the transverse passage 23 toward the other end of the plug, where it opens into a passage 26, communicating with the vent-pipe 20.

When the turn-plug is in the position shown in Figs. 3 to 6, the cock allows compressed air to pass from the tank 7, through the pipe 6, passage 23, and pipe 8, into the measuring vessel. If this vessel has been filled with liquid from the storage-tank or otherwise, the compressed air introduced into it closes the check-valve 4 and pressing on the surface of the liquid expels it through the outlet-pipe 14, the liquid thus being displaced from the measuring vessel until its level has fallen to such a point that air may escape through the outlet-pipe. It will thus be seen that the height of the inner end of this outlet-pipe, as shown by the scale and index 13, determines and measures the amount of liquid delivered by the vessel. The liquid expelled from the vessel flows through the pipe 18, passage 22, and finally out through the pipe 19. The operator now turns the plug of the cock in the direction indicated by the arrows one-fourth of a revolution, thereby closing the air-inlet and liquid-outlet of the vessel, but putting the air-pipe 8 into communication with the vent-pipe 20. The weight of the liquid in the storage-tank 5 thereupon opens the check-valve 4, thereby filling the measuring vessel, while the air in it escapes through the vent-pipe. Another quarter-revolution of the cock-plug in the reverse direction again empties the measuring vessel, as already described.

It will be obvious that the structural details of the apparatus may be considerably varied within the scope of the invention as claimed.

I claim—

1. An apparatus for measuring and delivering liquids, comprising an air-tight vessel with inlets for liquid and compressed air and an outlet for liquid, a pipe connected to said outlet and having a vertically-adjustable free end below said outlet, and an index fixed on said vessel for indicating the position of said free end, as set forth.

2. An apparatus for measuring and delivering liquids, comprising an air-tight vessel with inlets for liquid and compressed air and an outlet for liquid, a check-valve controlling the liquid-inlet, a pipe connected to said outlet and having a vertically-adjustable free end below said outlet, and an index fixed on said vessel for indicating the position of said free end, as set forth.

3. An apparatus for measuring and delivering liquids, comprising an air-tight vessel with inlets for liquid and compressed air and an outlet for liquid, a flexible pipe connected to said outlet and having a vertically-adjustable free end below said outlet, and an index fixed on said vessel for indicating the position of said free end, as set forth.

4. An apparatus for measuring and delivering liquids, comprising an air-tight vessel with inlets for liquid and compressed air and an outlet for liquid, a check-valve controlling the liquid-inlet, a flexible pipe connected to said outlet and having a vertically-adjustable free end below said outlet, and an index fixed on said vessel for indicating the position of said free end, as set forth.

5. An apparatus for measuring and delivering liquids, comprising an air-tight vessel with inlets for liquid and compressed air and an outlet for liquid, a pipe connected to said outlet and having a vertically-adjustable free end below said outlet, a graduated member secured to said free end, and a separate air-tight opening receiving said graduated member, as set forth.

6. An apparatus for measuring and delivering liquids, comprising an air-tight vessel with inlets for liquid and compressed air, a liquid-outlet pipe, said pipe having one end vertically adjustable within said vessel, a guide-rod fixed in the bottom of said vessel, and a graduated tube secured to the adjustable end of said outlet-pipe, sliding on said guide-rod and passing through the top of said vessel, as set forth.

7. An apparatus for measuring and delivering liquids, comprising an air-tight vessel with an inlet for compressed air and a liquid-outlet pipe having one end vertically adjustable within said vessel, a supply-tank having a pipe containing a check-valve and leading to said vessel, and a vent-pipe leading from said vessel to a point above the liquid-level in said supply-tank, as set forth.

8. An apparatus for measuring and delivering liquids, comprising an air-tight vessel with inlets for liquid and compressed air, a liquid-outlet pipe, said pipe having one end vertically adjustable within said vessel, a source of compressed air, a vent-pipe, and a cock having passages which in one position admit compressed air to the vessel and in another position cut off the supply of compressed air and open communication with the vent-pipe, as set forth.

9. An apparatus for measuring and delivering liquids, comprising an air-tight vessel with inlets for liquid and compressed air, a liquid-outlet pipe, said pipe having one end vertically adjustable within said vessel, a source of compressed air, a vent-pipe, a liquid-delivery pipe, and a cock having passages which in one position admit compressed air to the vessel and open the liquid-outlet pipe to said delivery-pipe, and in another position cut off the supply of compressed air, close the liquid-outlet pipe and open communication with the vent-pipe, as set forth.

In testimony whereof I affix my signature in presence of two witnesses.

GUILFORD L. SPENCER.

Witnesses:
 EUGENE A. BYRNES,
 C. A. NEALE.